(12) United States Patent
Klostermann

(10) Patent No.: US 6,937,587 B1
(45) Date of Patent: Aug. 30, 2005

(54) METHOD OF AND AN ARRANGEMENT FOR PROVIDING TELECOMMUNICATIONS SERVICE TO A USER IN A DATA NETWORK

(75) Inventor: Lucas Klostermann, Utrecht (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/530,997

(22) PCT Filed: Nov. 9, 1998

(86) PCT No.: PCT/EP98/07217

§ 371 (c)(1),
(2), (4) Date: Sep. 1, 2000

(87) PCT Pub. No.: WO99/25129

PCT Pub. Date: May 20, 1999

(30) Foreign Application Priority Data

Nov. 10, 1997 (EP) ............................. 97203489

(51) Int. Cl.⁷ ............................................ H04Q 7/28
(52) U.S. Cl. ..................... 370/338; 370/401; 370/352
(58) Field of Search ................................ 370/352, 401, 370/524, 351, 353–356, 338, 349, 410; 455/422, 433, 435

(56) References Cited

U.S. PATENT DOCUMENTS 5,563,933 A * 10/1996 August et al. ......... 379/114.01
6,097,719 A * 8/2000 Benash et al. ............... 370/352
6,347,085 B2 * 2/2002 Kelly ......................... 370/352
6,470,010 B1 * 10/2002 Szviatovszki et al. ...... 370/356

FOREIGN PATENT DOCUMENTS

WO 96/38018 11/1996
WO 99/25129 5/1999

OTHER PUBLICATIONS

XP 000100215 – "Introduction to names, addresses and routes in an OSI environment", Ahmed Patel et al., vol. 13, No. 1, pp. 27–36, Jan. 1990.

XP 000314666 – "Coordinated Address Resolution Protocol Processing", IBM Technical Disclosure Bulletin, vol. 35, No. 4A, Sep. 1992, pp. 28–31.

\* cited by examiner

*Primary Examiner*—Ajit Patel

(57) ABSTRACT

A method of and an arrangement for providing telecommunications service to a user in a computer data network, such as the Internet. The data network comprises a telecommunications server supporting telecommunications service in the data network and between the data network and a telecommunications system. The telecommunications system and the data network connect by a gateway arranged for exchanging information and signalling data. The telecommunications service is provided following the steps of:

accessing the telecommunications server by the user from a data network address;

providing user identity data by the user to the telecommunications server;

mapping the user identity data and the data network address by the telecommunications server; and providing telecommunications service to the user at the data network in accordance with the mapped user identity and data network address. Preferably, the user identity is associated with a Personal Number (PN) of a Universal Personal Telecommunication (UPT) service.

8 Claims, 2 Drawing Sheets

METHOD OF AND AN ARRANGEMENT FOR PROVIDING TELECOMMUNICATIONS SERVICE TO A USER IN A DATA NETWORK

FIELD OF THE INVENTION

The present invention relates generally to telecommunications systems and data networks and, more specifically, to a method of and an arrangement for providing telecommunications services to a user in a data network.

BACKGROUND OF THE INVENTION

Present computer data networks, such as the Internet, besides computer data services, also provide telecommunications services, such as traditional telephony. The integration of computer and telephony services has led to peripheral equipment offering computer and telecommunications services.

For telecommunications services, such as telephony, facsimily and other data transmissions, special networks like the Public Switched Telephone Network (PSTN) and the Integrated Services Digital Network (ISDN) are available. Modern PSTN/ISDN Intelligent Networks (IN) have an architecture comprising computer controlled Service Switching Point (SSP) equipment, providing call management and switching functions, Service Control Point (SCP) equipment, containing service profiles of subscribers of the network, and Service Data Point (SDP) data base equipment.

The subscribers of an IN telecommunications system, may roam to different sites maintaining their telecommunications services.

With the increased opportunities of data networks providing telecommunications service and data equipment offering special functions, such as broadcast message transfer, multidialing etc., users of a data network require easy access to both the telecommunications services of the data network and IN telecommunications systems for completing calls, among others telephone calls. Further, subscribers to an IN telecommunication system may have a need for roaming to a data network while maintaining their services available from the telecommunications system.

International patent application WO 96/38018 discloses a method of and system for setting up a speech connection between a data network and an IN telecommunications network, which networks are linked by a so-called gateway. A gateway provides an interface to the data network, operating under a data network protocol, and the telecommunications network, operating under a telecommunications network protocol.

The data network is arranged to support telecommunications service in the data network and between the data network and the telecommunications network. Information between the networks is exchanged via the gateway.

Following the method disclosed in WO 96/38018 a communication link is established between the data network and the IN telecommunications network by transferring, to SCP equipment of the IN telecommunications network, among others, the data network address of the user for recording in the SDP equipment. The information stored is used for routing calls between the different networks to and from the user.

With the increase of calls between networks, for privacy and maintenance purposes, operators target at network integrity, that is preventing as much as possible transfer and storage of alien information not applicable to operations of the particular network. In the method disclosed by WO 96/38018 such alien information is the data network address stored in the SDP equipment of the IN telecommunications system.

In an article by Patel, A et al., "Introduction to names, addresses and routes in an OSI environment", Computer Communications, vol. 13, no. 1, January/February 1990, pages 27–36, an addressing scheme within the context of an Open Systems Interconnection (OSI) system is disclosed.

In an OSI environment many entities exist. Entities may range from physical objects (e.g. hosts, gateways, routers, printers), to logical entities (e.g. processes, services, agents, roles).

For assigning human readable names to such entities, an addressing scheme has been disclosed comprising addresses identifying entities to which named objects are bound. This name-to-address mapping is achieved by means of a directory look-up. By introducing addresses, user-friendly names can be applied to the several entities which may exist in an OSI environment.

SUMMARY OF THE INVENTION

It is an object of the present invention to disclose an easy to implement method of and a system for providing telecommunications service to a user in or linked to a data network. The telecommunications service is to be provided by the data network and/or a telecommunications system to which the data network connects, following established signalling protocols in the telecommunications system, while maintaining as much as possible network privacy and network integrity.

It is in particular an object of the present invention to provide telecommunications service to a user in or linked to a data network, which user is potentially anonymous to the data network and/or the telecommunications system.

It is a further object of the present invention to provide a method of and an arrangement for providing telecommunications service to a user in a data network, such as the Internet, in accordance with telecommunications services available to the user from a subscription at a telecommunications system.

It is in particular an object of the present invention, to increase the roaming possibilities of a subscriber of an IN telecommunications system towards a computer data network while maintaining anonymity of the user in the data network.

In a first aspect of the present invention, starting from International patent application WO 96/38010, there is disclosed a method of providing telecommunications service to a user in a computer data network, such as the Internet, wherein the data network supports telecommunications service in the data network and between the data network and a telecommunications system, the telecommunications system and the data network connect by a gateway arranged for exchanging information and signalling data, the method comprising the steps of:

accessing the telecommunications service by the user from a data network address;

providing user identity data by the user to the telecommunications service, and;

providing telecommunications service to the user at the data network in accordance with the user identity data and the data network address, characterised by the steps of:

supporting the telecommunications service by a telecommunications server comprised by the data network;

mapping the user identity data and the data network address by the telecommunications server; and providing telecommunications service to the user at the data network in accordance with the mapped user identity and data network address.

In the method according to the invention, no express authorization is required by the user in the data network for accessing telecommunications service available at the data network. The data network address from which the user logs in remains within the data network, i.e. the telecommunications server. The user is only known under his user identity data provided which, in principal, can be arbitrarily chosen within the data network context.

Access to the telecommunications systems is provided via the gateway which, towards the telecommunications system, is accessible by a gateway access number following standard protocols and signalling relating to call set up and service provision to subscribers of the telecommunications system.

In a further embodiment of the method according to the invention, the telecommunications service provided is limited to special services, such as services not incurring costs upon a user. An example of such services are free phone numbers or calls for which the called subscriber will take the costs, for example.

With this feature, in particular in commercial telecommunications provisions, due to the fact that the user is potentially anonymous, unlimited and costly use of telecommunications services is prevented.

In a yet further embodiment of the method according to the invention, the service provided may be limited to a specific region of the data network and/or the telecommunication system, such as locally within the area of the user or the data network.

Further, the telecommunications service provided may be limited to calls to the user in the data network following the user identity data provided.

If the user is also a subscriber of an IN telecommunications system or is otherwise authorized to use services of the telecommunications system, in a second aspect, the method according to the invention provides:

accessing a subscriber roaming service of the IN telecommunications system by the user through the gateway;

providing subscriber information by the user to the subscriber roaming service for registration purposes;

registrating the user at the subscriber roaming service as being roamed to the gateway; and providing telecommunications service to the user at the data network in accordance with telecommunications services available to the user following his subscription at the telecommunications system.

The user is registered at the subscriber roaming service as being roamed to the gateway, identified by the gateway access number which is extracted in accordance with standard signalling protocols of the IN telecommunication system.

With the subscriber roaming service of the telecommunications system, the subscriber home number of the user, or an access number to which the user is authorized to access, is linked to the gateway access number, either a dedicated gateway access number or a default gateway access number. With the roaming service, service profile information of the subscriber stored in the SCP equipment is linked to the respective gateway access number, in such a manner that telecommunications services available at the home subscriber number can also be provided to the identified gateway access number. Following the mapping of the user identity data and the data network address, the user in the data network is provided with telecommunications service following his subscription or authorization with the IN telecommunications system.

Different from the prior art mentioned above, in the method according to the invention, by linking the user through the gateway access number, no alien information such as data network addresses is to be exchanged with the telecommunications system.

Those skilled in the art will appreciate that with the method according to the invention, the existing signalling capabilities of the telecommunications system do not have to be amended or extended, because the signalling data exchanged in the telecommunication network in connection with a call of a user of a data network are completely based on the established rules relating to access numbers.

With the method according to the invention, a clear separation is provided between the routing of the call in the telecommunication system and the routing of the call in the data network. Thus, both networks can be optimized independently, following their specific protocols and standards, while at the same time operator privacy is maintained. That is, the data network operators do not need to have information with respect to the network location of called subscribers in the telecommunications network, whereas the telecommunication network operator does not need to have information with respect to the network address of a user in the data network. With the method according to the invention, the user can log in anonymously at the data network while being able to complete and receive calls via the telecommunications service provided by both the data network and the telecommunications system.

The subscriber information provided by a user, next to the subscriber number of the user in the telecommunications system, may also require coded or secrete information, such as a Personal Identification Number (PIN) for authorization purposes.

Once the data network user is properly registered at the telecommunications system, principally all the services available under his/her subscription can be provided to calls from and to the user in the data network.

Calls to and from a user in the data network can be handled in the same registration session at the subscriber roaming service. After termination of the session, in a further embodiment of the invention, calls in the telecommunications system to the subscriber number of the roamed user will be transferred to the data network in accordance with the subscriber number information, gateway access number, and mapped user identity data and data network address.

If the subscriber again would like to make use of the telecommunications system services, the registration session at the roaming service of the telecommunications system has to be repeated. Once the user has been roamed back to the telecommunications system, for example, repeated registration at the roaming service will result in skipping the mapping to the gateway access number.

In accordance with another embodiment of the present invention, the subscriber number of the telecommunications system is provided as the user identity required by the data network. That is, a default gateway access number can be used for access to the data network, while the user in the data network can be addressed using the subscriber number of the telecommunications system. In the telecommunications system, the signalling information to be exchanged is based on access numbers, fully complying to the system protocol.

In a preferred embodiment of the method according to the invention, the subscriber number information is a Personal Number (PN) of a Universal Personal Telecommunication (UPT) telecommunications service of the telecommunications system.

Using the PN as both the user identity of the data network and the subscriber number of the telecommunication network, a very easy to handle information transfer protocol between the networks is provided, however maintaining network privacy and network integrity.

Those skilled in the art will appreciate that the user identity data may comprise both a PN and an associated user identity valid in the data network environment.

In a yet preferred embodiment of the method according to the invention, the mapping of the user identity data and the data network address is performed by gatekeeper means of the data network. The subscriber roaming service is provided by SCP equipment of the IN telecommunications system. With this embodiment of the method according to the invention, costs of services provided, for example, can be charged following the protocols available in each particular network. By having the gateway, the gatekeeper means and the SCP equipment arranged for the exchange of standardized signalling information, a very flexible coupling of the networks is achieved.

The invention further provides an arrangement for providing telecommunications service to a user in a computer data network, such as the Internet, the data network being arranged for supporting telecommunications service in the data network and between the data network and a telecommunications system, the data network and the telecommunications system connect by a gateway arranged for exchanging information and signalling data, characterised in that, the data network comprises means arranged for mapping a data network address and user identity data provided by the user, and arranged for providing telecommunications service to the user at the data network in accordance with the mapped user identity data and data network address.

In general, the mapping means comprise control means and memory means to link the several routing data, i.e the user identity, and the data network address.

The above-mentioned and other features and advantages of the present invention will now be discussed in the following description and the accompanying drawings with reference to an exemplary embodiment.

DETAILED DESCRIPTION OF THE EMBODIMENTS

Figure 1:
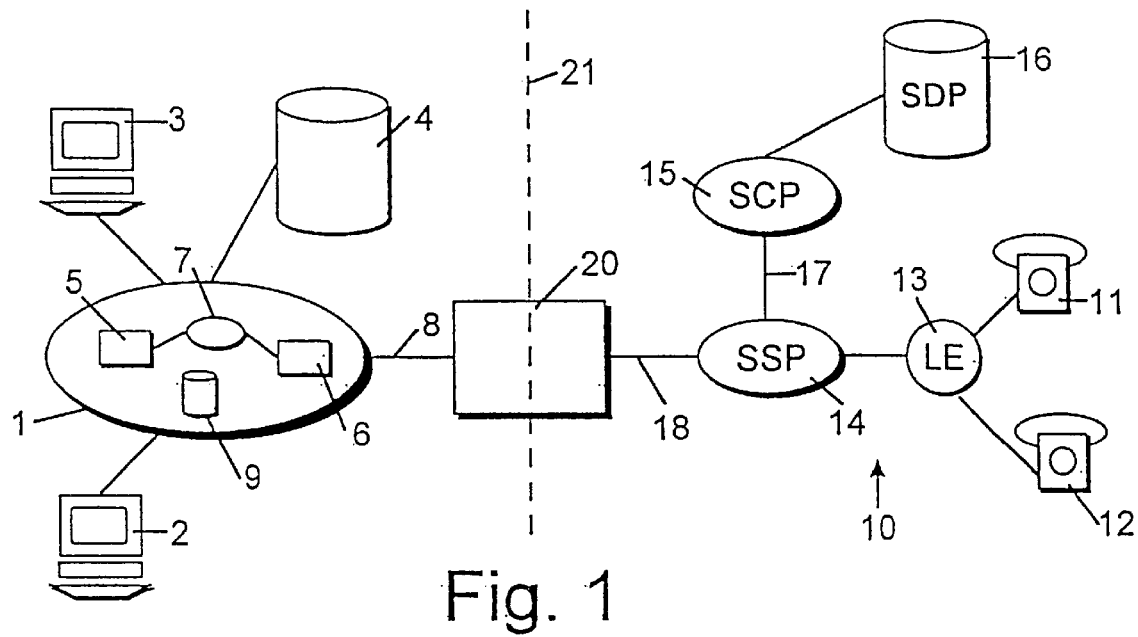
FIG. 1 shows a simplified block diagram of an Intelligent Network (IN) telecommunication systems and a data network connected by a gateway.

The left-hand part of FIG. 1 shows a typical data network 1, to which peripheral equipment connects, such as Personal Computers (PC) 2, 3 and memory or data base equipment 4. Modern multi media PC equipment comprises means for picture, voice and text processing.

The data network 1 may comprise several processing units 5, 6 such as computers of different processing capabilities, transaction and server equipment 7 etc. A striking example of a data network based on several interconnected computers is the Internet. At the Internet, for example, an Internet Voice Protocol (VoP) has been defined for enabling voice communication between the users of the network, i.e. the equipment 2, 3, through a so-called telecommunications server 9.

The right-hand part of FIG. 1 shows a typical Intelligent Network (IN) telecommunication system 10, such as the Public Switched Telephone Network (PSTN) or the Integrated Services Digital Network (ISDN), for example. Subscribers 11, 12 connect through a Local Exchange (LE) 13 to Service Switching Point (SSP) equipment 14.

The SSP equipment performs call management and call switching functions for routing calls through the IN telecommunication system 10 to the several subscribers thereof.

Modern IN telecommunication systems 10 provide a number of services to the user, in general on a subscription bases. The type and control of services available to the several users 11, 12 of the telecommunication system 10 are available in Service Control Point (SCP) equipment 15 and associated Service Data Point (SDP) database equipment 16. Each subscriber 11, 12 has a so-called service profile stored in the SDP 16, indicating the services and other information, such as billing, relating to a particular subscriber 11, 12. The SCP and SSP connect by a signalling network 17.

The data network 1 connects by a data transfer and signalling link 8 and the telecommunication system 10 connects by a trunk and signalling link 18 to a gateway 20.

As indicated by broken line 21, the gateway 20 forms a separating interface between the data network 1 and the telecommunication system 10.

The gateway 20 is operative for transferring information between the networks, in accordance with the particular network protocols. That is, information with the data network 1 is exchanged in accordance with the protocol of the data network 1, for example the Internet protocol, whereas the information with the telecommunication system 10 is exchanged in accordance with the network protocol of the telecommunication system. Network protocols used are standardised and known by those skilled in the art. Among others, reference is made to the international patent application WO 96/38018.

Figure 2:
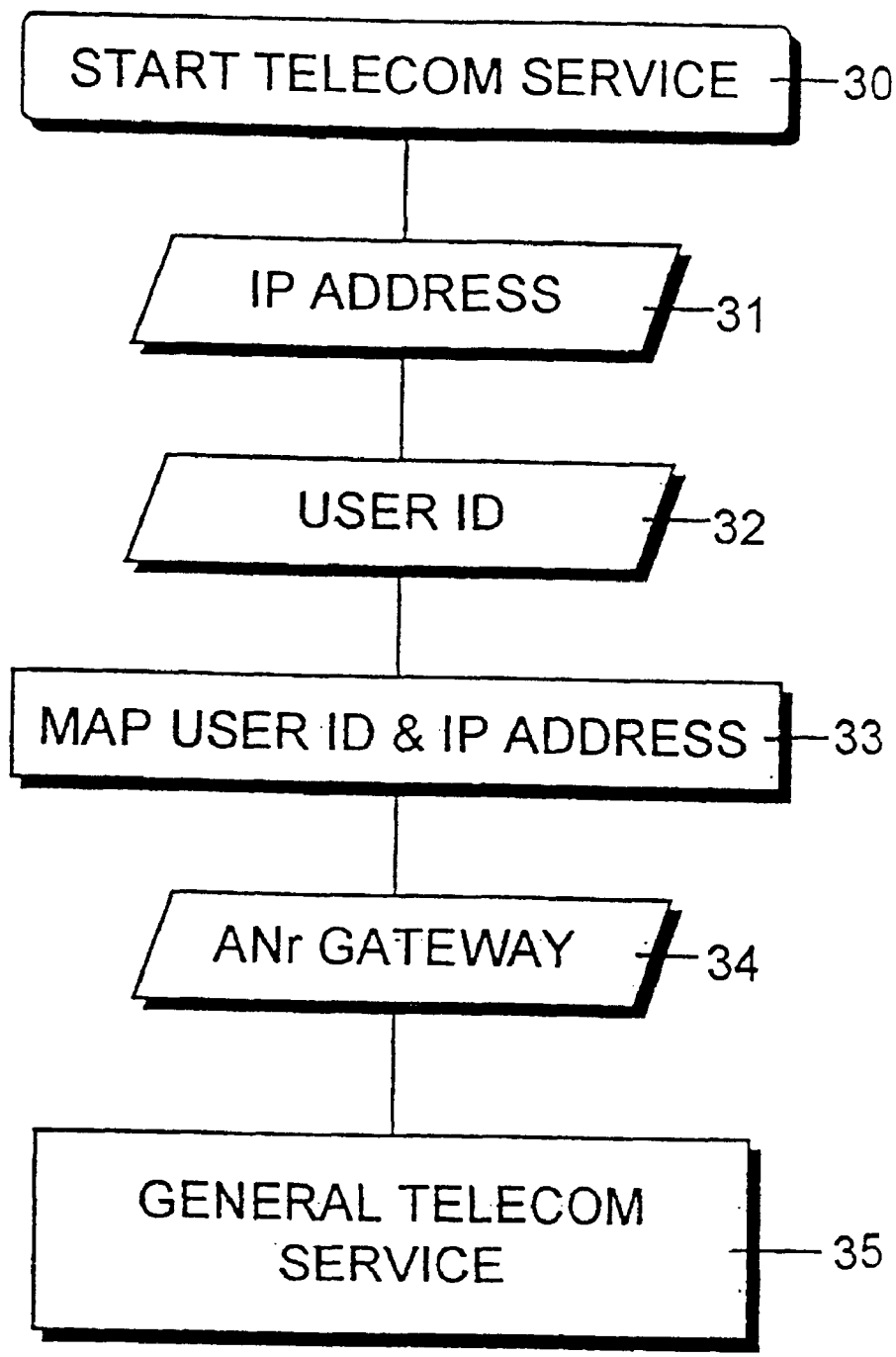
FIG. 2 shows a simplified flow diagram of the method according to the invention, in a first aspect thereof.

FIG. 2 shows a simplified flow diagram of the method according to the invention, for accessing telecommunication services of the telecommunication system 10 by a user in the data network 1.

The procedure starts at block 30, wherein a user via a periphal device 2, for example, indicates to access telecommunications services. The procedure can be started, for example, by activating a proper execution programm, by actuating particular keys of the keyboard of a multi media PC, or an other data device arranged for placing calls to the telecommunication system 10 etc., i.e. "START TELECOM SERVICE".

After the data network 1 has been accessed, the network address of the user device is provided, also known as IP address. In general, this network address is already known by the data network 1, such that it will be automatically retrieved by the data network 1. However, it is also possible that the user keys in the IP address, i.e. block 31 "IP ADDRESS".

Next, the user 2 provides user identity data, as indicated by block 32, "USER ID". Again, the user ID can be provided by the user through keyboard means or automatically from an ID card, coupled to the peripheral means. The User ID may take any suitable form, processable by the data network protocol, such as a string of alphanumeric characters.

In the telecommunications server 9 of the data network 1, the user ID and the IP address of the user are mapped, such that information to and from the user can be simply addressed using the user ID. From the mapping of the user ID and the IP address the data network 1 will than deliver the information at the correct IP address of the user. Note that the IP address can be temporarily, such that if the user changes location, a new map of the user ID and the new IP address has to made. The result of the mapping of block 33 can be stored, for example, in the data base 4.

The connection with the telecommunication system is established via the gateway 20, as shown in FIG. 1.

In order to access the telecommunication system 10 by the gateway 20 through standard protocol and signalling an access number addressing the gateway is obtained, such as shown in block 34 of FIG. 2, "ANr GATEWAY", while the access number of the gateway and the user ID are linked.

The linked user ID and the gateway access number may be stored in the telecommunications server 9, for example. However, in another embodiment of the method according to the invention, separate so-called gatekeeper means are provided in the data network 1. In general, the gatekeeper means 9 comprise control means and memory means.

After completion of the above process, any information can be exchanged between the user 2 at the data network 1 and the telecommunication system 10.

With the above method according to the invention, there is no need for storage of IP address information in the SCP equipment 15 of the telecommunication system 10. The gateway access number is an access number within the telecommunication system 10, like a subscriber number, fully complying to the network protocol of the telecommunication system 10. Accordingly, no additional functionality has to be implemented in the telecommunication system 10, such as transfer of IP addresses and the storage thereof, following the prior art method as disclosed by WO 96/38018.

By performing the mapping operations in accordance with the network protocol of the data network 1, in the data network 1 information to and from the telecommunication system 10 can be completely processed following its own network protocol.

Accordingly, with the method of the invention, the gateway 20 operates as an interface between the data network 1 and the telecommunication system 10, maintaining network integrity and network privacy, such as indicated by broken line 21 in FIG. 1.

With the above access method of the invention, no authentication of the user is provided. That is the user can log in completely anonymously. Accordingly, after accessing the telecommunication system 10 in this manner, telecommunication network operators may decide that a user is only allowed to access particular services of the telecommunication network, for example, services not incurring costs upon the user. Examples of such services are free phone number, that is calls to which no charging applies or the called subscriber bears the costs, for example. In FIG. 2 indicated by block 35, "GENERAL TELECOM SERVICES". Further access can be limited to geographical regions of a network and/or only for the receipt of calls.

However, billing of costs of services provided by the telecommunication system 10 can be easily charged via the gateway access number, allocated to a particular data network operator. Via the mapped user ID and IP address the data network operator can transfer the costs to the particular IP address, using well established charging mechanisms in the data network 1. Again it is emphasized that the interworking between the data network 1 and the telecommunication system 10, also for the charging of services, does not require any change in the functionality and protocols of the telecommunication system 10.

Figure 3:
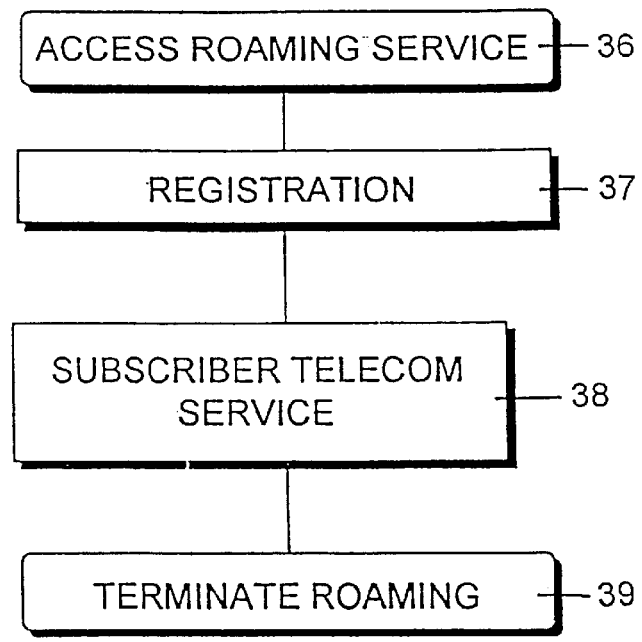
FIG. 3 shows a simplified block diagram of the method according to the invention, in a second aspect thereof.

In order to provide users in the data network 1, which are also subscribers of the telecommunication system 10, with all the services subscribed to in the telecommunication system, in a further embodiment of the method according to the invention, a roaming service of the telecommunication system 10 can be accessed, as indicated with block 36 in FIG. 3, i.e. "ACCESS ROAMING SERVICE".

The roaming service 36 can be accessed once a user has accessed the telecommunication system 10, as disclosed above in connection with FIG. 2.

The roaming service 36 can be entered, for example, by calling a particular service access number of the telecommunication system 10, for example.

After accessing the roaming service, the user has to provide subscriber information in order to register at the roaming service, such as indicated by block 37 in FIG. 3, "REGISTRATION".

In a preferred embodiment of the method according to the invention, the subscriber information refers directly to the subscriber number of the user in the telecommunication system 10. That is, in particular, the subscriber information is equal to the subscriber number of the user.

The linkage of the subscriber information and the gateway access number is processed in the SCP equipment 15 of the telecommunication system 10 and the result can be stored in the SDP data base 16. The SCP equipment 15 also contains the subscriber service profile information, that is all the services available to a particular subscriber.

After registration, as shown with block 38 in FIG. 3 "SUBSCRIBER TELECOM SERVICE", the user 2 in the data network 1 can place telephone calls or exchange other data with other subscribers of the telecommunication system 10 or other subscribers in the data network 1 for which access to the telecommunication system 10 is necessary.

After completion of the information exchange, the roaming service will be terminated, as shown in block 39 "TERMINATE ROAMING". Termination is provided following the same procedures and mechanisms as if the user would have been roamed within the telecommunication system itself.

Although not explicitly disclosed, those skilled in the art will appreciate that the registration step in the roaming service procedure may involve the provision of authentication information, such as a Personal Identification Number (PIN) and the verification of this information, in order to prevent malicious use of services by users other than the particular subscriber.

Further, billing of services can be achieved in the telecommunication system 10 via the available mechanisms for billing a subscriber number. However, the costs incurred may also be charged via the data network operator, as disclosed above.

After termination of the roaming, in a preferred embodiment of the invention, the mapped subscriber information and gateway access number are maintained in the SCP equipment 15, such that calls in the telecommunication system 10 to the particular subscriber can be routed via the gateway 20 to the corresponding IP address in the data network 1, following the stored mapping of user ID and IP address.

In the case of subscribers of the telecommunication system who have roamed to the data network 1, it is preferred to choose as the user ID in the data network 1 the subscriber number of the user in the telecommunication system 10.

In the method according to the invention, as shown in FIG. 2, the gateway access number can be chosen as a default access number, for example, if a user 2 of the data network 1 simply would like to use services not incurring costs, for example. If the user identity in the data network 1 is the same as the subscriber number of the user in the telecommunication system 10, it is also possible to use a default gateway access number or any gateway access number providing access to the data network 1, because calls to and from the user 2 in the data network 1 can be uniquely identified both in the telecommunication system 10 as well as in the data network 1 by the particular subscriber number. Note that network privacy and network integrity are still maintained.

The method according to the present invention is particularly suitable for use with a Universal Personal Telecommunication (UPT) telecommunication service of a telecommunication system, wherein subscribers are uniquely identified by a so-called Personal Number (PN), and wherein the user ID is chosen equal to the PN. In such case, the user is uniquely addressable in both networks, with maximum flexibility as to the interaction between the gateway 20 and the telecommunication system 10 on the one hand, and the gateway 20 and the data network 1 on the other while the user can log in anonymously at the data network 1.

It goes without saying that, if a particular user roams back from the data network 1 to the telecommunication system 10, the roaming service 36 has to be accessed in order to delete the linkage to the gateway 20 in the SCP 15.

With the separation between IP address and user ID, a user may roam freely within the data network 1, while maintaining the services of the telecommunication system 10, once the roaming service has been accessed. Accession of the roaming service 36 can be automatically provided for a particular user after starting the telecommunication service 30 from the data network 1.

The invention is not limited to information exchange between one data network and one telecommunication system. In practice, the gateway 20 can be arranged for transfer of information between a plurality of data networks and a plurality of telecommunication systems, if required.

What is claimed is:

1. A method of accessing a telecommunications service in a telecommunications system by a user device in a data network, the method comprising:

accessing the data network, wherein a data network (IP) address of the user device is retrieved by the data network;

providing user device identity data (ID) to a telecommunications server in the data network, wherein the user device ID and the IP address of the user device are mapped;

connecting to the telecommunications system via a gateway utilizing at least an access number associated with the gateway;

linking the user device ID and the gateway access number;

storing the linked user device ID and the gateway access number; and exchanging information between the user device and the telecommunications network.

2. A method according to claim 1, wherein said telecommunications service provided is limited to special services not incurring costs upon a user.

3. A method according to claim 1, wherein said telecommunications service provided is geographically and regionally limited.

4. A method according to claim 1, wherein said user device is a subscriber of an Intelligent Network (IN) telecommunications system, said method further comprising the steps of:

accessing a subscriber roaming service of said IN telecommunications system by said user device through said gateway;

providing subscriber information to said subscriber roaming service for registration purposes;

registering said user device at said subscriber roaming service as being roamed to said gateway; and providing telecommunications service to said user device in said data network in accordance with telecommunications services available to said user device following subscription at said telecommunications system.

5. A method according to claim 4, wherein said user is associated with said subscriber information.

6. A method according to claim 5, wherein said subscriber information is a Personal Number (PN) of a Universal Personal Telecommunication (UPT) telecommunications service of said telecommunications system.

7. A method according claim 6, wherein after registration of said user device at said roaming service calls from said telecommunications system to said user device will be transferred to said user device in said data network in accordance with said mapped user ID and said data network address.

8. A method according to claim 4, wherein said mapping of said user ID and said data network address is performed by gatekeeper means of said data network, and wherein said subscriber roaming service is provided by Service Control Point (SCP) equipment of said IN telecommunications system.

* * * * *